(12) United States Patent
Kasai et al.

(10) Patent No.: US 7,696,738 B2
(45) Date of Patent: Apr. 13, 2010

(54) METHOD AND CIRCUIT FOR CONTROLLING DC-DC CONVERTER

(75) Inventors: Toshihiko Kasai, Kasugai (JP); Masatoshi Kokubun, Kasugai (JP); Kenji Kato, Kasugai (JP)

(73) Assignee: Fujitsu Microelectronics Limited, Yokohama (JP)

( * ) Notice: Subject to any disclaimer, the term of this patent is extended or adjusted under 35 U.S.C. 154(b) by 161 days.

(21) Appl. No.: 11/898,690

(22) Filed: Sep. 14, 2007

(65) Prior Publication Data

US 2008/0067989 A1   Mar. 20, 2008

(30) Foreign Application Priority Data

Sep. 15, 2006   (JP) ............... 2006-251520

(51) Int. Cl.
*G05F 1/575* (2006.01)
(52) U.S. Cl. .................................. 323/285
(58) Field of Classification Search ............... 323/282, 323/283, 284, 285, 351
See application file for complete search history.

(56) References Cited

U.S. PATENT DOCUMENTS

| | | | |
|---|---|---|---|
| 5,912,552 A | 6/1999 | Tateishi | |
| 6,815,939 B2 | 11/2004 | Umemoto et al. | |
| 6,949,917 B2 | 9/2005 | Umemoto et al. | |
| 7,119,525 B1 * | 10/2006 | Yoshino | 323/283 |
| 7,170,272 B2 * | 1/2007 | Yoshida | 323/284 |
| 7,279,870 B2 * | 10/2007 | Hasegawa et al. | 323/224 |
| 7,456,623 B2 * | 11/2008 | Hasegawa et al. | 323/285 |
| 7,482,796 B2 * | 1/2009 | Nishida | 323/284 |
| 2004/0036458 A1 | 2/2004 | Johnson et al. | |
| 2007/0069703 A1 * | 3/2007 | Kokubun et al. | 323/282 |
| 2008/0030178 A1 * | 2/2008 | Leonard et al. | 323/282 |
| 2008/0054873 A1 * | 3/2008 | Inoue | 323/351 |

FOREIGN PATENT DOCUMENTS

| | | |
|---|---|---|
| CN | 1453926 A | 11/2003 |
| JP | 10-225105 A | 8/1998 |
| JP | 2002-281743 A | 9/2002 |
| JP | 2002-354787 A | 12/2002 |
| JP | 2005-253253 A | 9/2005 |
| JP | 2006-166667 A | 6/2006 |

* cited by examiner

*Primary Examiner*—Adolf Berhane
(74) *Attorney, Agent, or Firm*—Arent Fox LLP

(57) ABSTRACT

A DC-DC converter reducing reversed current in a low load state and increasing output voltage response speed. An error amplification circuit generates an error signal from the output voltage. A pulse signal generation circuit generates a first pulse signal in accordance with the error signal. A comparison circuit generates a comparison result signal from the error signal. A drive signal generation circuit generates a constant level signal and a second pulse signal. An output circuit receives the first pulse signal and either the constant level signal or the second pulse signal to generate first and second drive signals for driving first and second transistors. The output circuit generates the second drive signal in accordance with the first pulse signal when receiving the constant level signal and generates the second drive signal with the first and second pulse signals when receiving the second pulse signal.

17 Claims, 5 Drawing Sheets

METHOD AND CIRCUIT FOR CONTROLLING DC-DC CONVERTER

CROSS-REFERENCE TO RELATED APPLICATIONS

This application is based upon and claims the benefit of priority from the prior Japanese Patent Application No. 2006-251520, filed on Sep. 15, 2006, the entire contents of which are incorporated herein by reference.

BACKGROUND

Nowadays, portable electronic devices are widely used. A battery is attached to the electronic device as a drive power supply. Usage of the electronic device and discharging decreases the output voltage of the battery. Thus, a direct current voltage conversion circuit (DC-DC converter) for converting the voltage of the battery to a constant voltage is arranged in the electronic device. When the load of the DC-DC converter fluctuates, the output voltage must be controlled in accordance with such fluctuation. It is required that the speed for such responses be increased.

In the prior art, a compact switching type DC-DC converter (switching regulator) having satisfactory conversion efficiency is used for a portable electronic device. The switching regulator is a pulse width modulation (PWM) regulator that alternately activates a main switching transistor and a synchronization transistor. Energy is supplied from the input to the output of the switching regulator when the main switching transistor is activated. Energy accumulated in an inductor is discharged when the main switching transistor is inactivated. The output voltage is kept substantially constant by controlling the pulse width of a pulse signal for driving the main switching transistor in accordance with the output voltage or output current.

When the load is low, current flows from the load to ground through the synchronization transistor when the main switching transistor is inactivated (i.e., when the synchronization transistor is activated). This causes energy loss. The following methods have been proposed in the prior art to prevent such energy loss.

Japanese Laid-Open Patent Publication No. 2006-166667 describes a diode rectifying method for connecting a commutation diode (free-wheel) in parallel to the synchronization transistor, and inactivating the synchronization transistor in accordance with the load. Japanese Laid-Open Patent Publication No. 2002-281743 describes a DC-DC converter for detecting a reversed flow of current and inactivating the synchronization transistor. Japanese Laid-Open Patent Publication No. 2002-354787 describes a DC-DC converter for estimating the current that flows through a coil and inactivating the synchronization transistor in accordance with the estimated current.

SUMMARY

One aspect of the present invention is a DC-DC converter for generating an output voltage from an input voltage. The DC-DC converter includes a first transistor for receiving the input voltage. A second transistor is coupled to the first transistor. A choke coil includes a first terminal coupled to a connection node between the first and second transistors and a second terminal for outputting the output voltage. An error amplification circuit compares the output voltage and a first reference voltage and generates an error signal. A pulse signal generation circuit generates a first pulse signal that is in accordance with the error signal. A comparison circuit compares the error signal and a second reference voltage and generates a comparison result signal. The comparison result signal is in either one of a first logic state and a second logic state. A drive signal generation circuit receives the comparison result signal and generates either one of a constant level signal and a second pulse signal. The drive signal generation circuit generates the constant level signal when receiving the comparison result signal in the first logic state and generates the second pulse signal when receiving the comparison result signal in the second logic state. An output circuit receives the first pulse signal and either one of the constant level signal and the second pulse signal and generates first and second drive signals for respectively driving the first and second transistors. The output circuit generates the second drive signal in accordance with the first pulse signal when receiving the constant level signal and generates the second drive signal with the first and second pulse signals when receiving the second pulse signal.

A further aspect of the present invention is a method for controlling a DC-DC converter that generates an output voltage from an input voltage. The DC-DC converter includes a first transistor for receiving the input voltage, a second transistor coupled to the first transistor, and a choke coil coupled to a connection node between the first and second transistors. The method includes generating an error signal by comparing the output voltage and a first reference voltage, generating a first pulse signal in accordance with the error signal, generating a comparison result signal by comparing the error signal and a second reference voltage, generating a constant level signal when the comparison result signal is in a first logic state, generating a second pulse signal when the comparison result signal is in a second logic state, receiving the first pulse signal and either one of the constant level signal and the second pulse signal, and generating first and second drive signals for respectively driving the first and second transistors. The step of generating first and second drive signals includes generating the second drive signal in accordance with the first pulse signal when the comparison result signal is in the first logic state, and generating the second drive signal with the first and second pulse signals when the comparison result signal is in the second logic state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
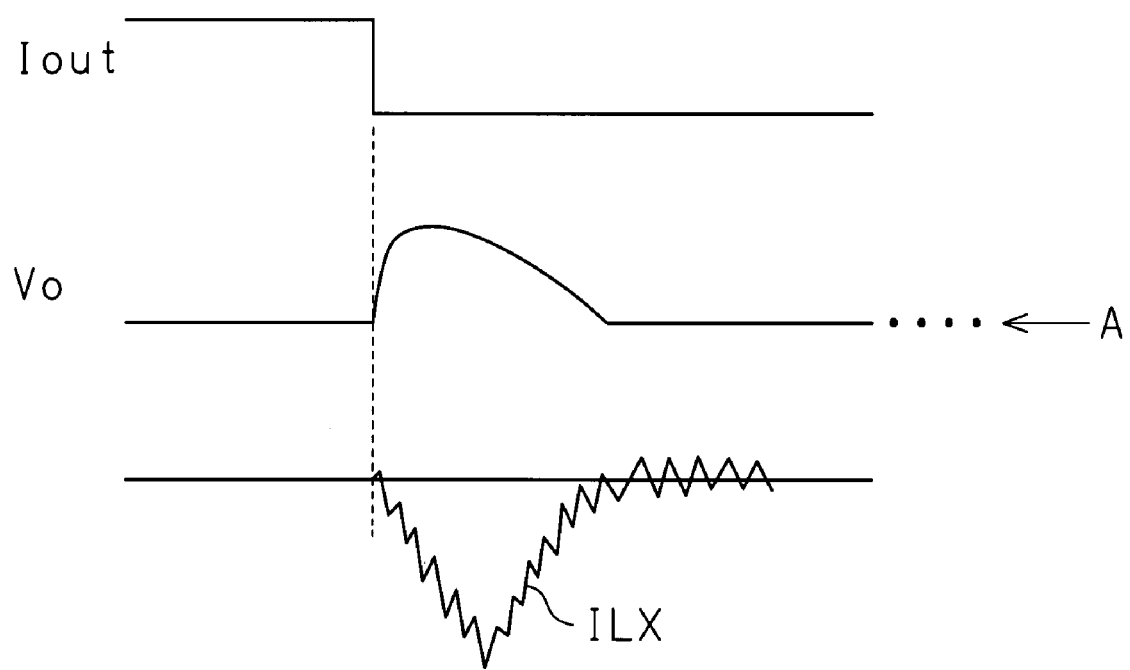
FIG. 1 is a schematic operation waveform chart of a conventional DC-DC converter.

Referring to FIG. 1, when the output current Iout suddenly decreases due to a change in the load, it takes time until the output voltage Vo stabilizes at the desired voltage (the level indicated by arrow A) in the DC-DC converter described in each of the above publications. As described above, the output voltage Vo stabilizes within a short period of time if the synchronization transistor is not inactivated when the main switching transistor is activated (i.e., reversed flow is allowed). However, a large amount of current ILX that is greater than or equal to a specified value flows to the coil in the reverse direction.

The present invention provides a DC-DC converter and a method for controlling such a DC-DC converter that reduce the reversed flow of current and improves the response speed of the output voltage when the load is low. The present invention further provides a DC-DC converter and a method for controlling such a DC-DC converter that prevent a reversed flow of current in a normal state and reduce a reversed flow of current while increasing the response speed of the output voltage when the load is low.

In the drawings, like numerals are used for like elements throughout.

A DC-DC converter 10 according to a first embodiment of the present invention will now be described with reference to FIGS. 2 to 4.

Figure 2:
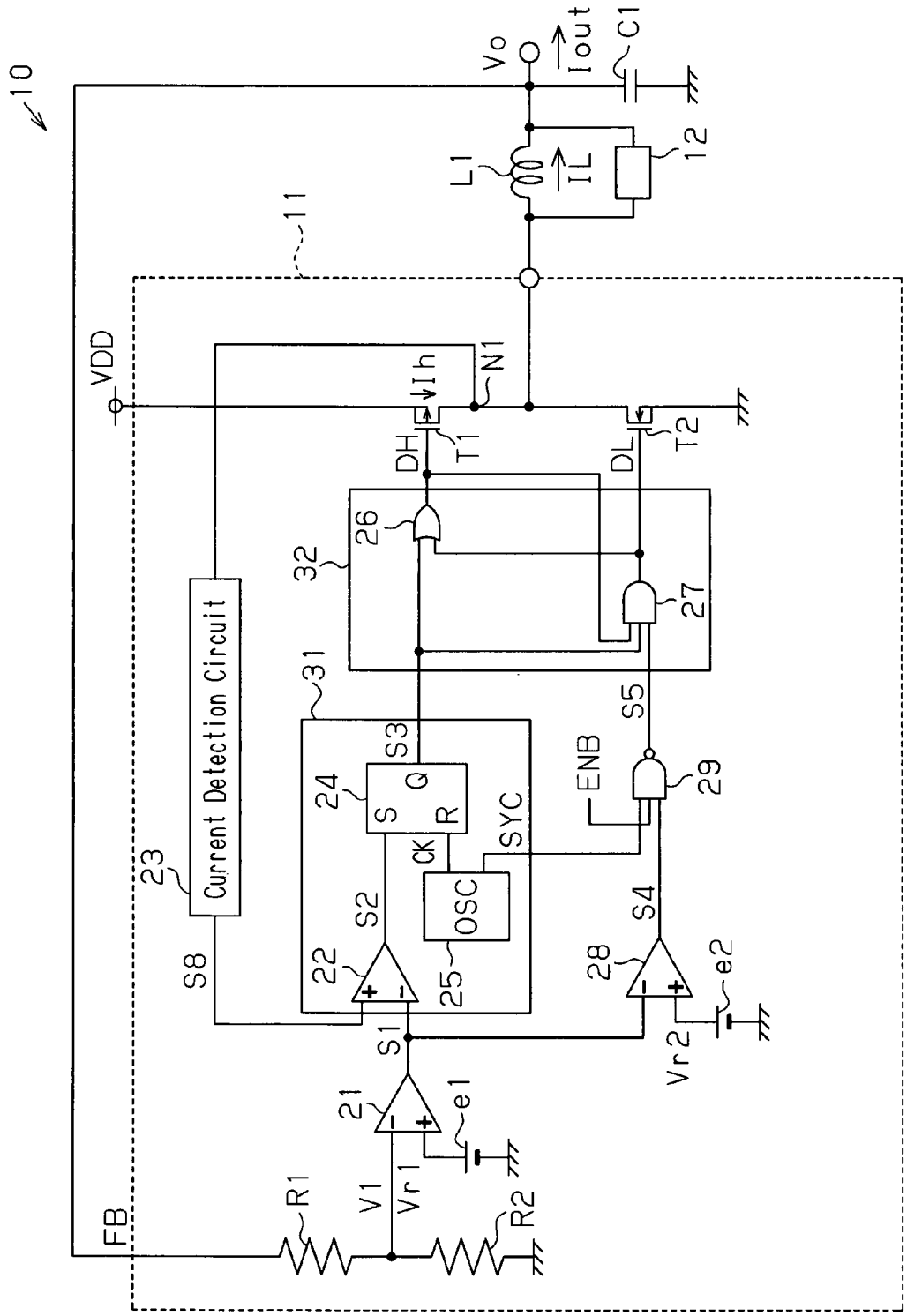
FIG. 2 is a schematic block circuit diagram of a DC-DC converter according to a first embodiment of the present invention.

FIG. 2 is a schematic block circuit diagram of the DC-DC converter 10. The DC-DC converter 10 generates an output voltage Vo by lowering an input voltage VDD.

The DC-DC converter 10 is a current control type DC-DC converter that includes a control circuit 11, a choke coil L1, a smoothing capacitor C1, and a snubber circuit 12. The DC-DC converter 10 is configured to stabilize the output voltage Vo by performing a current mode operation. In the current mode operation, an error amplifier amplifies the difference between a reference voltage and the output voltage Vo and generates an amplified voltage. Further, a current comparator compares the amplified voltage and a voltage that is proportional to the current flowing to the choke coil L1. The DC-DC converter 10 stabilizes the output voltage Vo by controlling the peak current of the choke coil L1 based on the output of the current comparator.

The choke coil L1 has a first terminal connected to the output terminal of the control circuit 11 and a second terminal connected to a semiconductor integrated circuit device (not shown) serving as a load. The control circuit 11 supplies output voltage Vo to the load via the choke coil L1. The smoothing capacitor C1, which is connected to the second terminal of the choke coil L1, smoothes the output voltage Vo. The output voltage Vo is supplied to the control circuit 11 as a feedback signal FB.

The snubber circuit 12 is connected in parallel to the choke coil L1. The snubber circuit 12, which includes a resistor and a capacitor connected in series, suppresses resonance when a first transistor T1 and a second transistor T2 are both inactivated. That is, the snubber circuit 12 reduces ringing in the output of the DC-DC converter 10.

The feedback signal FB is provided to a first terminal of a resistor R1 in the control circuit 11. The resistor R1 has a second terminal connected to a first terminal of a resistor R2. The resistor R2 has a second terminal connected to ground. The resistors R1 and R2 form a voltage dividing circuit. The voltage dividing circuit generates a divided voltage V1 by dividing the voltage of the feedback signal FB, or the output voltage Vo, with the resistors R1 and R2. The divided voltage V1 is supplied to an inversion input terminal of an error amplifier 21 serving as an error amplification circuit. Reference voltage Vr1 is supplied from a reference power supply e1 to a non-inversion input terminal of the error amplifier 21. The error amplifier 21 amplifies the difference between the divided voltage, which is proportional to the output voltage Vo, and the reference voltage Vr1 and generates an error signal S1. Then, the error amplifier 21 provides the error signal S1 to a current comparator 22 in a pulse signal generation circuit 31.

The current comparator 22 includes an inversion input terminal for receiving the error signal S1 from the error amplifier 21 and a non-inversion input terminal for receiving an output signal (current detection signal) S8 of a current detection circuit 23. The current comparator 22 compares the error signal S1 and the output signal S8 to generate a signal (current comparison signal) S2 indicating the comparison result. The signal S2 is provided to a flip-flop circuit (FF circuit) 24 in the pulse signal generation circuit 31.

The FF circuit 24 is an RS-flip-flop circuit that includes a set terminal S for receiving the signal S2, a reset terminal R for receiving a clock signal CK generated by an oscillator (OSC) 25 in the pulse signal generation circuit 31, and an output terminal Q. The oscillator 25 generates the clock signal CK having a predetermined frequency. The period in which the clock signal CK has an H level is set to the time required to reset the output signal of the FF circuit 24. The oscillator 25 also generates a synchronization control signal SYC (see FIG. 3) having a predetermined duty ratio (e.g., 50 percent) and synchronized with the clock signal CK.

The FF circuit 24 raises the signal S3 to an H level when the signal S2 provided to the set terminal S2 has an H level. The FF circuit 24 lowers the signal S3 to L level in when the clock signal CK provided to the reset terminal R has an H level. The signal S3 output from the output terminal Q of the FF circuit 24 is provided to a first driver circuit 26 and a second driver circuit 27 in an output circuit 32.

The error signal S1 output from the error amplifier 21 is provided to a comparator 28 serving as a comparison circuit. The comparator 28 includes an inversion input terminal for receiving the error signal S1 and a non-inversion input terminal for receiving a reference voltage Vr2 from a reference power supply e2. The reference voltage Vr2 is set in accordance with the output voltage Vo, or the error signal S1, that changes in accordance with the load.

Figure 4:
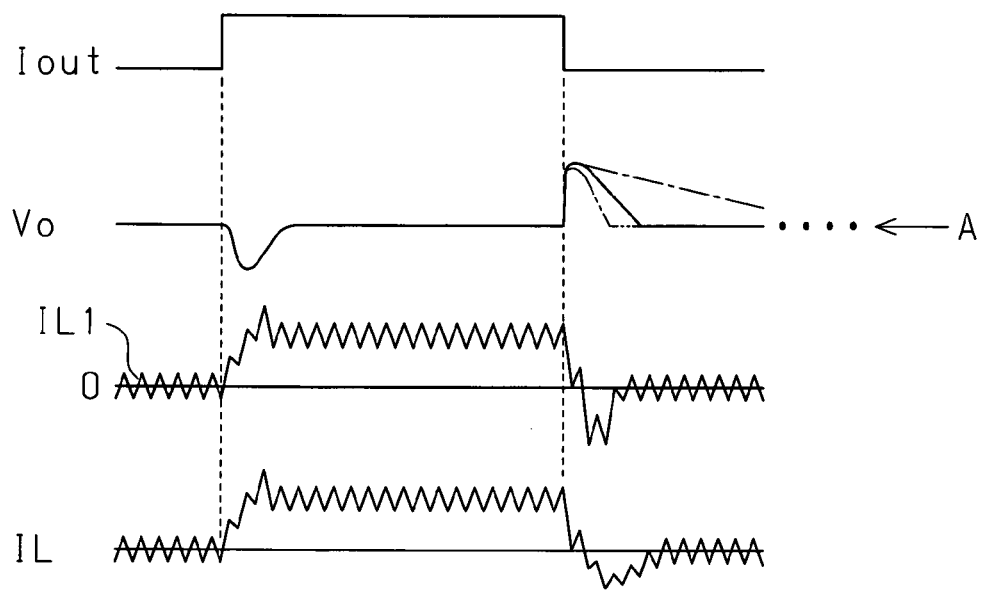
FIG. 4 is a schematic operation waveform chart of the DC-DC converter of FIG. 2.

As shown in FIG. 4, the output voltage Vo momentarily decreases when the output current, that is, the current Iout supplied to the load suddenly increases. In contrast, the output voltage Vo momentarily increases when the load current Iout suddenly decreases and shifts to a low load state. The control circuit 11 activates and inactivates the first and second transistors T1 and T2 so that the divided voltage V1 and the first reference voltage Vr1 coincide with each other. When the output voltage Vo takes an intermediate value of a stable output range, the error signal S1 is stabilized at the intermediate value of the output range of the signal S1. The error signal S1 rises when the output voltage Vo decrease and falls when the output voltage Vo increases. Accordingly, the second reference voltage Vr2 is set to be lower than the minimum value of the output range of the signal S1 when the output voltage Vo is stable (level corresponding to the maximum value of stable output range of output voltage Vo) to enable detection of a decrease in the error signal S1, that is, a sudden decrease of the load. Preferably, the second reference voltage Vr2 is set to 0.1 V (volts).

The comparator 28 generates a detection signal S4 having an H level when the voltage of the error signal S1 is lower than the reference voltage Vr2. Further, the comparator 28 generates a detection signal S4 having an L level when the voltage of the error signal S1 is higher than the reference voltage Vr2.

A NAND circuit 29 serving as a drive signal generation circuit generates a drive control signal S5 based on the detection signal S4, the synchronization control signal SYC, and a control enable signal ENB. The control enable signal ENB is a signal indicating whether or not to execute reversed flow control, as will be described later. The NAND circuit 29 generates the drive control signal S5 having inverted logic of the synchronization control signal SYC when the detection signal S4 and the control enable signal ENB have H levels. Further, the NAND circuit 29 generates the drive control signal S5 at an H level when at least either one of the detection signal S4 and the control enable signal ENB has an L level.

The first driver circuit 26 is an OR circuit. The first driver circuit 26 computes the logical sum of the output signal S3 of the FF circuit 24 and a second drive signal DL output from the second driver circuit 27. Then, the first driver circuit 26 provides a first drive signal DH, which indicates the computation result, to the first transistor T1 serving as a main switching transistor. The second driver circuit 27 is an AND circuit. The second driver circuit 27 performs a logical AND operation with the output signal S3 of the FF circuit 24, the first drive signal DH output from the first driver circuit 26, and the drive control signal S5. Then, the second driver circuit 27 provides a second drive signal DL, which indicates the computation result, to the second transistor T2 serving as a synchronization transistor.

The first transistor T1 is a P-channel MOS transistor in the first embodiment. The first transistor T1 includes a gate (control terminal) for receiving the first drive signal DH, a source for receiving an input voltage VDD, and a drain. The second transistor T2 is an N-channel MOS transistor in the first embodiment. The second transistor T2 includes a gate (control terminal) for receiving the second drive signal DL, a drain connected to the drain of the first transistor T1, and a source connected to the ground. The first transistor T1 is activated when the first drive signal DH has an L level and inactivated when the first drive signal DH has an H level. The second transistor T2 is inactivated when the second drive signal DL has an L level and activated when the second drive signal DL has an H level.

A connection node (node N1) between the first transistor T1 and the second transistor T2 is connected to the output terminal of the DC-DC converter 10 via the choke coil L1. The node N1 is also connected to the current detection circuit 23. The current detection circuit 23 detects the current flowing to the choke coil L1 based on the potential at the node N1 and generates the signal S8, the voltage of which is proportional to the detected current.

The operation of the DC-DC converter 10 will now be discussed.

First, the operation of the DC-DC converter 10 in a first state (S1>Vr2) will be described. When the voltage of the error signal S1 is higher than the second reference voltage Vr1, the comparator 28 generates the detection signal S4 at an L level, and the NAND circuit 29 generates the drive control signal S5 at an H level. The control enable signal ENB has an H level.

Assuming that the control circuit 11 generates the first drive signal DH at an L level and the second drive signal DL at an L level, the first transistor T1 is activated by the L level first drive signal DH. Further, the second transistor T2 is inactivated by the L level second drive signal DL.

When the first transistor T1 is activated, the current flowing to the choke coil L1 increases, and the output voltage of the current detection circuit 23 increases. When the output signal S8 of the current detection circuit 23 becomes higher than the error signal S1, a signal S2 having an H level is provided to the set terminal S of the FF circuit 24. Thus, the output signal S3 of the FF circuit 24 rises to an H level. Accordingly, the first transistor T1 is inactivated by the first drive signal DH, which has an H level and which is generated in the first driver circuit 26. Furthermore, the second driver circuit 27 generates the second drive signal DL at an H level in response to the H level first drive signal DH, and the second transistor T2 is activated by the second drive signal DL. This discharges the energy stored in the choke coil L1.

Subsequently, the FF circuit 24 lowers the signal S3 to an L level in response to the clock signal CK having an H level that is output from the oscillator 25. The second driver circuit 27 generates the second drive signal DL at an L level in response to the signal S3 having an L level. The second transistor T2 is inactivated by the second drive signal DL having an L level. The first driver circuit 26 then generates the first drive signal DH at an L level in response to the second drive signal DL having an L level. The first transistor T1 is activated by the first drive signal DH.

Figure 3A:
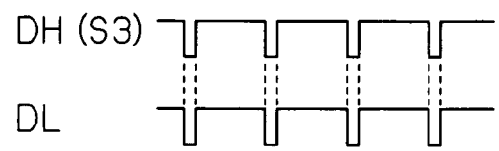
FIG. 3A is a schematic waveform chart showing operation of the DC-DC converter of FIG. 2 in a first state.

In this manner, the second transistor T2 is activated after the first transistor T1 is inactivated, and the first transistor T1 is activated after the second transistor T2 is inactivated. That is, as shown in FIG. 3A, the first driver circuit 26 and the second driver circuit 27 respectively generate the first and second drive signals DH and DL in accordance with the signal S3 so that the first and second transistors T1 and T2 are not simultaneously activated. In other words, the first and second transistors T1 and T2 are activated and inactivated in a complementary manner.

When the output voltage Vo decreases and the output voltage of the error amplifier 21 increases during such an operation, the time required for the output signal S2 of the current comparator 22 to shift from an L level to an H level lengthens. Thus, the activated time of the first transistor T1 lengthens. On the other hand, when the output voltage Vo increases and the output voltage of the error amplifier 21 decreases, the time required for the output signal S2 of the current comparator 22 to shift from an L level to an H level shortens. Thus, the activated time of the first transistor T1 shortens. Accordingly, the first transistor T1 is activated in predetermined cycles in accordance with the clock signal CK from the oscillator 25 and inactivated at a timing dependent on the output current IL (i.e., output voltage Vo). The inactivation timing of the first transistor T1 varies in accordance with the magnitude of the output voltage Vo, and the output voltage Vo is maintained at a constant value.

The operation of the DC-DC converter 10 in a second state (S1<Vr2) will now be described.

Figure 3B:
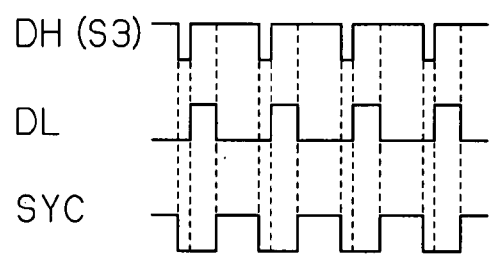
FIG. 3B is a schematic waveform chart showing operation of the DC-DC converter of FIG. 2 in a second state.

As shown in FIG. 4, when the load current Iout suddenly decreases, the output voltage Vo suddenly increases. As a result, the voltage of the error signal S1 becomes lower than the second reference voltage Vr2, and the comparator 28 generates the detection signal S4 at an H level. The control enable signal ENB has an H level. In this second state, the NAND circuit 29 generates the drive control signal S5 that has an inverted logic of the synchronization control signal SYC (see FIG. 3B). Therefore, the second driver circuit 27 raises the second drive signal DL to an H level in predetermined cycles in response to the pulses of the drive control signal S5. That is, the second drive signal DL rises to an H level (transistor T2 is activated) during a predetermined period even during the period the first drive signal DH has an H level (transistor T1 is inactivated), as shown in FIG. 3B. The second transistor T2 is activated when the second drive signal DL has an H level. Thus, reversed current flows to the choke coil L1. Accordingly, the output voltage Vo of the DC-DC converter 10 of the present invention (indicated by double-dash line in FIG. 4) is stabilized at the desired level A within a shorter period of time than the output voltage of the conventional DC-DC converter (indicated by single-dash line in FIG. 4) that prevents a reversed flow of current by inactivating the second transistor T2.

The period during which the second drive signal DL has an H level is determined in accordance with the duty ratio of the drive control signal S5, that is, the synchronization control signal SYC. Therefore, the activated period of the second transistor T2 becomes shorter in the second state than in the first state (FIG. 3A). The reversed current flow of the current IL flowing through the choke coil L1 becomes less than that of the conventional current IL1, as shown in FIG. 4, and does not exceed the specified value.

The DC-DC converter 10 of the first embodiment has the advantages described below.

The comparator 28 detects a sudden decrease in the load (current IL) by comparing the second reference voltage Vr2 and the error signal S1. The NAND circuit 29 generates the drive control signal S5 at a constant level (H level) in the first state (S1>Vr2) based on the detection signal S4 of the comparator 28. Further, the NAND circuit 29 generates the drive control signal S5 having a predetermined pulse width in the second state (S1<Vr2). In the first state, the second driver circuit 27 generates the second drive signal DL, which is in phase with the output signal S3 (first drive signal DH) of the FF circuit 24. Therefore, the first and second transistors T1 and T2 are driven in a complementary manner. When the drive control signal S5 is pulse-shaped, or in the second state, the second driver circuit 27 generates the second drive signal DL so that the activated time of the second transistor T2 is shorter than that in the first state. In other words, the second driver circuit 27 lowers the on-duty of the second transistor T2 in the second state but keeps the on-duty above zero.

In this manner, the error signal S1 is generated as the result of comparison between the divided voltage V1 of the output voltage Vo and the first reference voltage. The state of the load is detected from the error signal S1. In the first state, the first transistor T1 and the second transistor T2 are activated and inactivated in a complementary manner. That is, reversed current flows to the second transistor T2 in the first state. Accordingly, the output voltage is stabilized within a short period of time in the first state. The activated time of the second transistor T2 becomes shorter in the second state than in the first state. That is, the reversed flow of current is limited. A reversed flow of current is prevented from exceeding the specified value, and the response of the output voltage is improved.

A DC-DC converter 40 according to a second embodiment of the present invention will now be described with reference to FIGS. 5 and 6. To avoid redundancy, like or same reference numerals are given to those components that are the same as the corresponding components of the first embodiment. Such components will not be described in detail.

Figure 5:
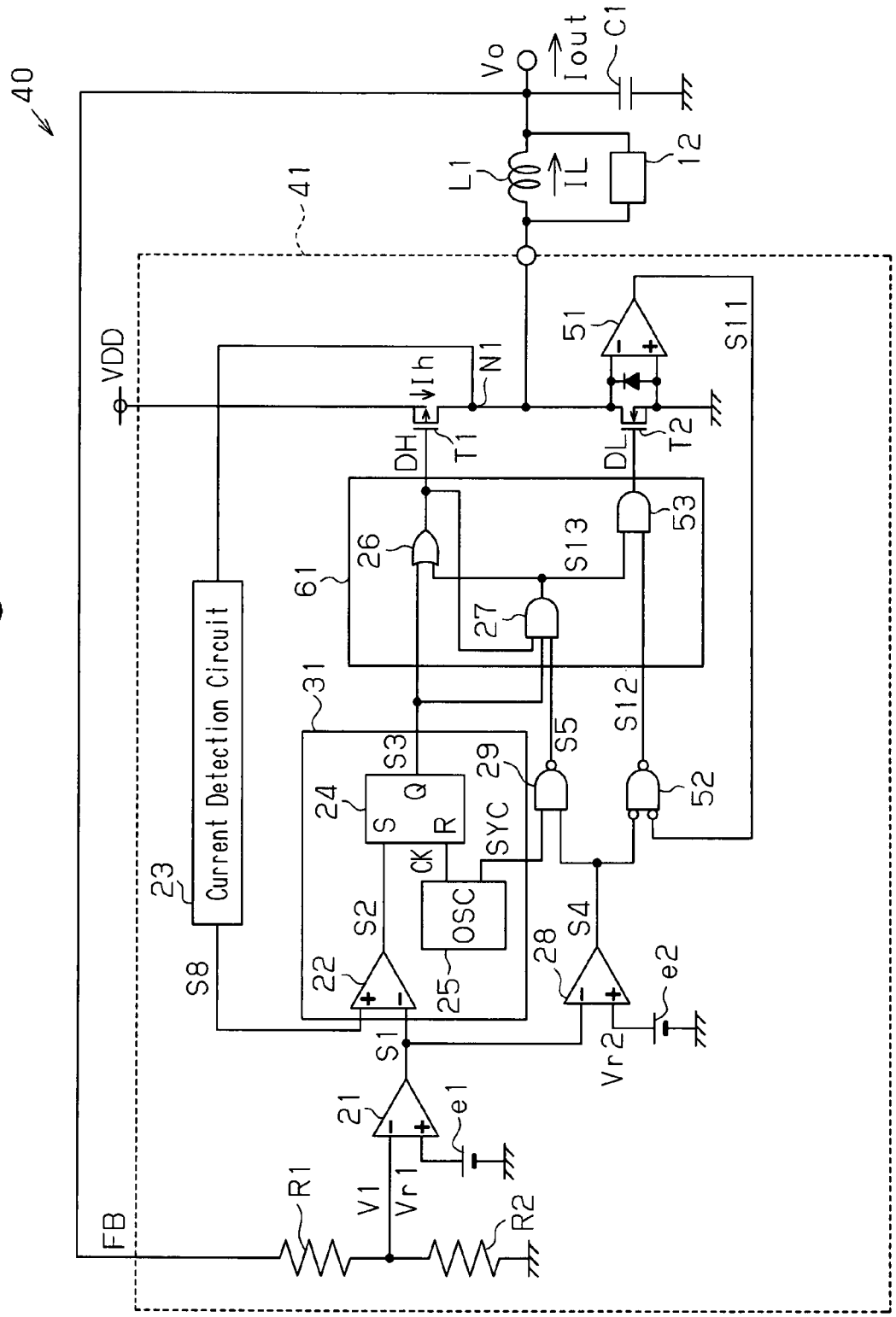
FIG. 5 is a schematic block circuit diagram of a DC-DC converter according to a second embodiment of the present invention.

FIG. 5 is a schematic block circuit diagram of the DC-DC converter 40 of the second embodiment. The DC-DC converter 40 is a current control type DC-DC converter that includes a control circuit 41, the choke coil L1, and the snubber circuit 12.

The second transistor T2, which serves as the synchronization transistor of the control circuit 41, has two terminals connected to a comparator 51, which serves as a reversed flow detection circuit. Specifically, the inversion input terminal of the comparator 51 is connected to the drain of the second transistor T2, and the non-inversion input terminal of the comparator 51 is connected to the source of the second transistor T2. The comparator 51 detects the current flowing to the choke coil L1 based on the potential at the source and drain of the second transistor T2 to generate a detection signal (reversed flow detection signal) S11 having an H level or L level in accordance with the detection result. In the second embodiment, the comparator 51 generates the detection signal S11 at an H level when the current flows from the ground towards the output terminal (load) and at an L level when the current flows from the output terminal towards ground.

The detection signal S11 output from the comparator 51 is input to a logic circuit 52 serving as a reversed flow control circuit. The logic circuit 52 is also provided with the detection signal S4 output from the comparator 28. The logic circuit 52 performs a logical AND operation with the inverted level of the detection signal S11 and the inverted level of the detection signal S4 to generate a drive control signal (reversed flow control signal) S12 having the inverted level of the operation result. For instance, the logic circuit 52 is configured by a first inverter circuit for receiving the detection signal S4, a second inverter circuit for receiving the detection signal S11, an AND circuit connected to the output terminal of the first and second inverter circuits, and an inverter circuit connected to the output terminal of the AND circuit.

The output circuit 61 of the second embodiment includes the first driver circuit 26, the second driver circuit 53, and the AND circuit 27 (second driver circuit in the first embodiment). The output signal S13 of the AND circuit 27 is provided to the second driver circuit 53. The second driver circuit 53 generates the second drive signal DL by synthesizing (logical AND operation) the drive control signal S12 and the output signal S13 of the AND circuit 27. The second drive signal DL is provided to the gate (control terminal) of the second transistor T2.

The logic circuit 52 generates the drive control signal S12 having substantially the same level as the detection signal S11 when the detection signal S4 has an L level. Further, the logic circuit 52 generates the drive control signal S12 at an H level when the detection signal S4 has an H level. The comparator 28 generates the detection signal S4 with an L level during normal operations in which the fluctuation of the load is gradual. Further, the comparator 28 generates the detection signal S4 with an H level in a second state (S1<Vr2). Accordingly, the logic circuit 52 generates the drive control signal S12 that is in accordance with, or in phase with, the detection signal S11 during normal operations and generates the drive control signal S12 at an H level in the second state.

The second driver circuit 53 generates the second drive signal DL having substantially the same level as the signal S13 when the drive control signal S12 has an H level. Further, the second driver circuit 53 generates the second drive signal DL at an L level when the drive control signal S12 has an L level.

The second drive signal DL corresponding to the detection signal S11 of the comparator 51 is provided to the second transistor T2. The second transistor T2 and the comparator 51 form an ideal diode ID. The ideal diode ID causes current to flow in the forward direction when the forward voltage is zero and prevents the flow of current in the reverse direction due to infinite impedance. Thus, an ideal rectifying property is obtained. Accordingly, the ideal diode ID prevents reversed flow of current (current flowing from the output terminal towards the ground) in the second transistor T2. Furthermore, loss of energy stored in the choke coil L1 is reduced when the first transistor T1 is inactivated since there is no voltage drop in the forward direction. This prevents the efficiency from decreasing when the output voltage is low.

During normal operations, the logic circuit 52 prevents reversed flow by operating the second transistor T2 and the comparator 51 as an ideal diode. When the load is low (second state), the logic circuit 52 does not operate the second transistor T2 and the comparator 51 as an ideal diode and permits a reversed flow.

As described above, the comparator 28 generates the detection signal S4 at an L level in a normal state and generates the detection signal S4 at an H level in the second state. The NAND circuit 29 generates the signal S5 having inverted logic for the synchronization control signal SYC when the detection signal S4 has an H level. Accordingly, in the second state, the AND circuit 27 raises the signal S13 to an H level in predetermined cycles in response to the pulses of the signal S5. That is, the AND circuit 27 generates the signal S13 to relatively shorten the activated time of the second transistor T2. In this state, the logic circuit 52 generates the drive control signal S12 having an H level when the detection signal S4 has an H level.

The second driver circuit 53 generates the second drive signal DL having substantially the same level as the signal S13 when the drive control signal S12 has an H level. Accordingly, in the second state, as shown in FIG. 6, the control circuit 41 limits a reversed flow of current by shortening the activated time of the second transistor T2 while allowing a reversed flow in the second transistor T2.

Figure 6:
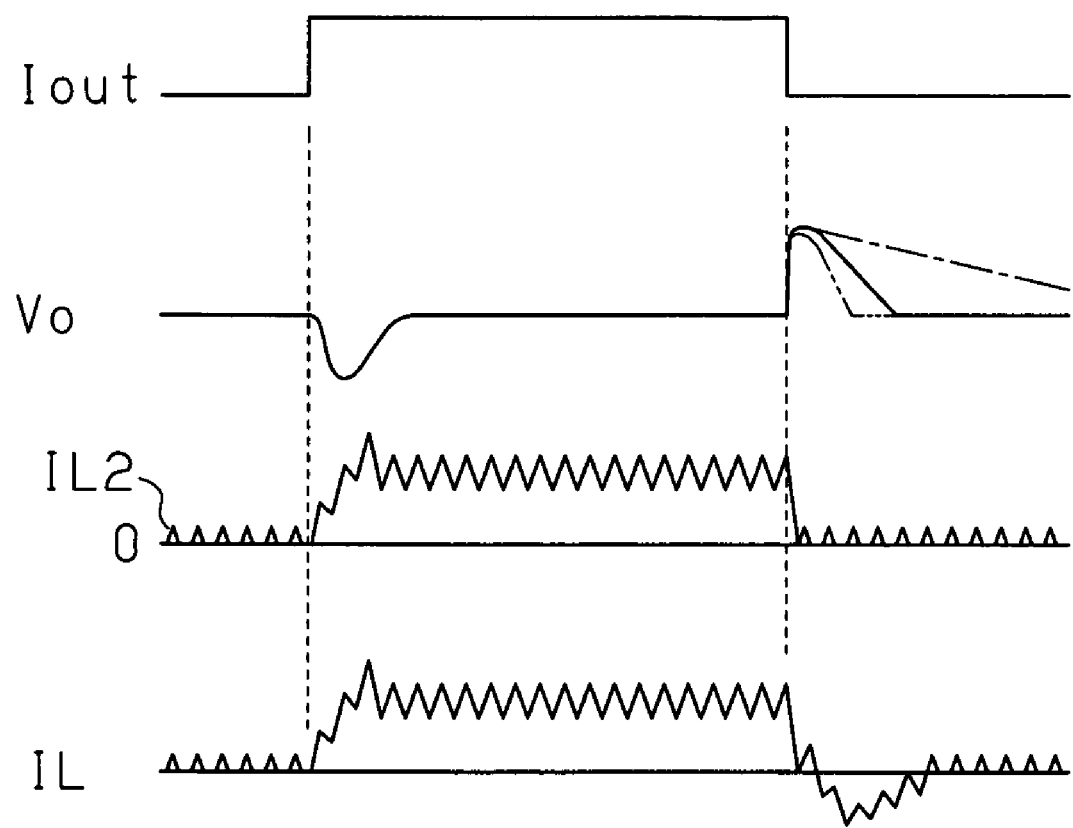
FIG. 6 is a schematic operation waveform chart of the DC-DC converter of FIG. 5.

As a result, compared to the DC-DC converter that does not allow reversed flow (conventional DC-DC converter that controls the current to flowed to the choke coil as in IL2 in FIG. 6), the output voltage Vo is more quickly stabilized to the desired voltage. Furthermore, by shortening the activated period of the second transistor T2, the current IL flowing to the choke coil L1 has less reversed current than the current IL1 in the prior art, as shown in FIG. 4, and does not exceed the specified value.

The DC-DC converter 40 of the second embodiment has the advantages described below.

The comparator 51 detects the reversed flow of current to the second transistor T2 from the choke coil L1 towards the low potential power supply. The logic circuit 52 prevents a reversed flow in the second transistor T2 in the first state based on the detection signal S11 of the comparator 51 and the detection signal S4 of the comparator 28. Further, the logic circuit 52 allows a reversed flow in the second transistor T2 when the load suddenly decreases.

As a result, a reversed flow of current does not occur in the first state. Thus, when the first transistor T1 is inactivated, loss of the energy stored in the choke coil L1 is reduced, and the efficiency is prevented from decreasing when the output voltage is low. Furthermore, in the second state a reversed flow of current is allowed and such reversed current flow of current is limited. Thus, the output voltage Vo is stabilized within a short period of time, and the reversed flow of current is prevented from exceeding the specified value.

It should be apparent to those skilled in the art that the present invention may be embodied in many other specific forms without departing from the spirit or scope of the invention. Particularly, it should be understood that the present invention may be embodied in the following forms.

The first transistor T1 and the second transistor T2 may be externally attached to the control circuit.

The first and second transistors may be N-channel MOS transistors. Alternatively, the first and second transistors may be P-channel MOS transistors. In this case, the output level of the first and second driver circuits 26, 27 (53) must be changed in accordance with the conductivity type of the first and second transistors.

The duty ratio of the synchronization control signal SYC may be varied in accordance with the time required for the output voltage Vo to stabilize (response speed) or the tolerable value of the reversed current. The activated period of the second transistor T2 is adjusted by varying the duty ratio of the synchronization control signal SYC. This changes the response speed of the output voltage Vo and the amount of reversed current.

The pulses of the synchronization control signal SYC do not necessarily have to correspond to the pulses of the clock signal CK. For example, a pulse may be omitted for every predetermined number of pulses.

The structure for preventing a reversed flow of current is not limited to the ideal diode of the second transistor T2 and the comparator 51. For example, a reversed current prevention circuit of a further embodiment includes a resistor, which is connected between the second transistor T2 and ground, and a comparator, which is connected in parallel to the resistor. In this case, the comparator inactivates the second transistor T2 by detecting a reversed flow of current from the potential difference between the two terminals of the resistor. Such a reversed current prevention circuit prevents a reversed flow of current during normal operations.

The control enable signal ENB may be provided to the NAND circuit 29 in the second embodiment. The control enable signal ENB does not necessarily have to be provided to the NAND circuit 29 in the first embodiment.

The DC-DC converter of the present invention may use a PWM comparator in lieu of the RS-flip-flop circuit (FF circuit) 24.

The error amplifier 21 may compare the output voltage Vo (feedback signal FB) and the reference voltage Vr1.

The pulse signal generation circuit 31 does not have to include the oscillator 25. That is, a pulse signal generation circuit including the current comparator 22 and the FF circuit 24 may be separate from the oscillator 25.

The present examples and embodiments are to be considered as illustrative and not restrictive, and the invention is not to be limited to the details given herein, but may be modified within the scope and equivalence of the appended claims.

What is claimed is:

1. A DC-DC converter generating an output voltage from an input voltage, the DC-DC converter comprising:
a first transistor receiving the input voltage;
a second transistor coupled to the first transistor;
a choke coil including a first terminal coupled to a connection node between the first and second transistors and a second terminal outputting the output voltage;
an error amplification circuit comparing the output voltage and a first reference voltage to generate an error signal;
a pulse signal generation circuit generating a first pulse signal that is in accordance with the error signal;
a comparison circuit comparing the error signal and a second reference voltage to generate a comparison result signal, the comparison result signal being in either one of a first logic state and a second logic state;
a drive signal generation circuit receiving the comparison result signal and selectively generating either one of a constant level signal and a second pulse signal based on the comparison result signal, with the drive signal generation circuit generating the constant level signal when receiving the comparison result signal in the first logic state and generating the second pulse signal when receiving the comparison result signal in the second logic state; and an output circuit receiving the first pulse signal and either one of the constant level signal and the second pulse signal and generating first and second drive signals respectively driving the first and second transistors, with the output circuit generating the second drive signal in accordance with the first pulse signal when receiving the constant level signal and generating the second drive signal with the first and second pulse signals when receiving the second pulse signal.

2. The DC-DC converter according to claim 1, wherein the output circuit generates the second drive signal so that the second transistor is activated for a shorter period when receiving the second pulse signal than when receiving the constant level signal.

3. The DC-DC converter according to claim 1, wherein the output circuit generates the second drive signal to intermittently activate the second transistor during inactivation of the first transistor when receiving the second pulse signal.

4. The DC-DC converter according to claim 1, wherein the output circuit generates the second drive signal to drive the second transistor at a first on-duty in a manner complementary to the first transistor when receiving the constant level signal and generates the second drive signal to drive the second transistor at a second on-duty that is smaller than the first on-duty when receiving the second pulse signal.

5. The DC-DC converter according to claim 1, wherein the second pulse signal includes a pulse train synchronized with a clock signal, which is for generating the first pulse signal.

6. The DC-DC converter according to claim 1, further comprising:

a current detection circuit, coupled to the connection node of the first and second transistors and the pulse signal generation circuit, detecting current flowing to the choke coil based on the voltage at the connection node and generating a current detection signal indicating the detection result;

wherein the pulse signal generation circuit includes:

a current comparator comparing the current detection signal and the error signal and generating a current comparison signal indicating the comparison result;

an oscillator generating a clock signal and a synchronization control signal, which has a predetermined pulse train; and a flip-flop circuit generating the first pulse signal using the current comparison signal and the clock signal; and the drive signal generation circuit generates the second pulse signal in accordance with the synchronization control signal when receiving the comparison result signal in the second logic state.

7. The DC-DC converter according to claim 6, wherein the oscillator generates the synchronization control signal synchronized with the clock signal.

8. The DC-DC converter according to claim 1, further comprising:

a reversed flow detection circuit detecting reversed current flowing from the choke coil to the second transistor; and a reversed flow control circuit, coupled to the reversed flow detection circuit and the comparison circuit, preventing reversed current from flowing when the comparison result signal is in the first logic state and allowing reversed current to flow when the comparison result signal is in the second logic state.

9. The DC-DC converter according to claim 8, wherein:

the reversed flow detection circuit includes a comparator, coupled to the second transistor, for detecting reversed current and generating a reversed flow detection signal;

the reversed flow control circuit includes a logic circuit generating a reversed flow control signal with the reversed flow detection signal and the comparison result signal, with the logic circuit generating the reversed flow control signal in accordance with the reversed flow detection signal when the comparison result signal is in the first logic state and generating the reversed flow control signal with a constant level when the comparison result signal is in the second logic state; and the output circuit generates the second drive signal with the first pulse signal and the reversed flow control signal.

10. The DC-DC converter according to claim 1, further comprising:

a snubber circuit coupled in parallel to the choke coil.

11. The DC-DC converter according to claim 1, wherein the first reference voltage takes an intermediate value in a stable output range of the output voltage, and the second reference voltage takes a value enabling detection of a maximum value of the stable output range of the output voltage.

12. A method controlling a DC-DC converter that generates an output voltage from an input voltage, the DC-DC converter including a first transistor receiving the input voltage, a second transistor coupled to the first transistor, and a choke coil coupled to a connection node between the first and second transistors, the method comprising:

generating an error signal by comparing the output voltage and a first reference voltage;

generating a first pulse signal in accordance with the error signal;

generating a comparison result signal by comparing the error signal and a second reference voltage;

generating a constant level signal when the comparison result signal is in a first logic state;

generating a second pulse signal when the comparison result signal is in a second logic state; and receiving the first pulse signal and either one of the constant level signal and the second pulse signal; and generating first and second drive signals respectively driving the first and second transistors, wherein said generating first and second drive signals includes:

generating the second drive signal in accordance with the first pulse signal when the comparison result signal is in the first logic state; and generating the second drive signal with the first and second pulse signals when the comparison result signal is in the second logic state.

13. The method according to claim 12, wherein said generating the second drive signal with the first and second pulse signals includes generating the second drive signal to intermittently activate the second transistor when the first transistor is inactivated.

14. The method according to claim 12, further comprising:

driving the second transistor at a first on-duty in a manner complementary to the first transistor when the comparison result signal is in the first logic state; and driving the second transistor at a second on-duty that is smaller than the first on-duty when the comparison result signal is in the second logic state.

15. The method according to claim 12, wherein said generating a second pulse signal includes generating the second pulse signal to have a pulse train synchronized with a clock signal, which is for generating the first pulse signal.

16. The method according to claim 12, wherein:
said generating a first pulse signal includes generating the first pulse signal in accordance with a clock signal; and
said generating a second pulse signal includes generating the second pulse signal in accordance with a synchronization control signal synchronized with the clock signal.

17. The method according to claim 12, further comprising:
detecting reversed current flowing from the choke coil to the second transistor;
preventing reversed current from flowing when the comparison result signal is in the first logic state; and
allowing reversed current to flow when the comparison result signal is in the second logic state.

* * * * *